United States Patent
Beumler (10) Patent No.: US 9,731,807 B2
(45) Date of Patent: Aug. 15, 2017

(54) JOINTS IN FIBRE METAL LAMINATES (71) Applicant: Airbus Operations GmbH, Hamburg (DE)

(72) Inventor: Thomas Beumler, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 232 days.

(21) Appl. No.: 14/622,056

(22) Filed: Feb. 13, 2015

(65) Prior Publication Data

US 2015/0225061 A1    Aug. 13, 2015

(30) Foreign Application Priority Data

Feb. 13, 2014  (EP) ..................................... 14155070

(51) Int. Cl.
| | |
|---|---|
| *B64C 1/00* | (2006.01) |
| *B32B 37/12* | (2006.01) |
| *B32B 37/16* | (2006.01) |
| *B32B 15/14* | (2006.01) |
| *B32B 3/06* | (2006.01) |
| *B32B 3/08* | (2006.01) |
| *B32B 5/02* | (2006.01) |
| *B32B 5/12* | (2006.01) |

(Continued)

(52) U.S. Cl.
CPC ................... *B64C 1/00* (2013.01); *B32B 3/06* (2013.01); *B32B 3/08* (2013.01); *B32B 5/02* (2013.01); *B32B 5/12* (2013.01); *B32B 7/005* (2013.01); *B32B 7/12* (2013.01); *B32B 15/092* (2013.01); *B32B 15/14* (2013.01); *B32B 15/20* (2013.01); *B32B 37/1284* (2013.01); *B32B 37/16* (2013.01); *B32B 2260/046* (2013.01); *B32B 2262/0269* (2013.01); *B32B 2262/101* (2013.01); *B32B 2262/106* (2013.01); *B32B 2605/18* (2013.01); *B64C 2001/0072* (2013.01); *B64C 2001/0081* (2013.01)

(58) Field of Classification Search
CPC ........... Y10T 428/19; B64C 1/00; B64C 3/00; B64C 5/02
See application file for complete search history.

(56) References Cited

U.S. PATENT DOCUMENTS

| | | | |
|---|---|---|---|
| 5,429,326 | A | 7/1995 | Garesche et al. |
| 6,736,919 | B1 | 5/2004 | Roebroeks |

(Continued)

FOREIGN PATENT DOCUMENTS

WO    02/078950 A1    10/2002

*Primary Examiner* — Alexander Thomas
(74) *Attorney, Agent, or Firm* — Lorenz & Kopf, LLC (57) ABSTRACT

An aircraft panel with a laminate structure is provided that comprises a stack of a plurality of metal sheet layers, at least one fiber reinforced adhesive layer, and at least one cover segment. At least one outer layer of the metal sheet layers comprises at least two separate metal sheets that overlap with each other along their respective commonly adjoining edges, providing an overlapping joint of the two separate metal sheets. The at least one fiber reinforced adhesive layer comprises fiber elements embedded in a matrix structure. One of the at least one fiber reinforced adhesive layers is arranged between two adjacent metal sheet layers. Further, the at least one cover segment is arranged on an outside surface of the laminate structure, the cover segment covering a region of the overlapping joint. Still further, the at least one cover segment comprises at least one layer of reinforcement fibers.

13 Claims, 5 Drawing Sheets (51) Int. Cl.
  *B32B 7/00*     (2006.01)
  *B32B 7/12*     (2006.01)
  *B32B 15/20*    (2006.01)
  *B32B 15/092*   (2006.01)

(56) References Cited

U.S. PATENT DOCUMENTS

2007/0042214 A1  2/2007  Rajabali et al.
2010/0086804 A1  4/2010  Popp et al.

JOINTS IN FIBRE METAL LAMINATES

CROSS-REFERENCE TO RELATED APPLICATION

This application claims priority to European Patent Application No. 14 155 070.7 filed Feb. 13, 2014, which is incorporated herein by reference in its entirety.

TECHNICAL FIELD

The subject matter herein relates to a laminate structure, and relates in particular to an aircraft panel with a laminate structure, to an aircraft, and to a method for manufacturing an aircraft panel, as well as to a use of a panel in an aircraft.

BACKGROUND

In aircraft construction, panels for the fuselage construction, for example, can be provided as laminate panels where a number of metal sheets are attached to each other by providing fibre reinforced adhesive layers in between adjacent metal sheets. However, due to the use of metal foils and their given maximum size, the laminates are restricted to a maximum width, depending on the width of the provided metal foils. Hence, for larger fuselage construction segments, for example, riveted joints between adjacent foils become necessary for forming larger panels. As a result of an increasing number of joints, the weight of the fuselage construction increases, meaning a decrease in terms of the aircraft's efficiency during operation. Therefore, splicing is used, wherein adjacent metal foils are connected via a splice connection in order to form larger panels, compared to the size of the individual metal sheets. For example, U.S. Pat. No. 5,429,326 describes splicing of adjacent metal foils by an abutting arrangement, wherein the abutment joints are displaced in the direction of the cross-section. Further, U.S. Pat. No. 6,736,919 describes a splice connection, in which adjacent sheets are at least partly overlapping at their edge zones. However, it has been shown that an area comprising resin or matrix material is provided in an exposed manner on the outside of the panel, thus resulting in a zone of reduced strength.

Hence, there may be a need to provide a laminate construction with increased size and improved performance, in particular, to achieve an increased life performance of the construction.

According to an embodiment, an aircraft panel with a laminate structure is provided, wherein the laminate structure comprises a stack of a plurality of metal sheet layers, at least one fibre reinforced adhesive layer, and at least one cover segment. At least one outer layer of the metal sheet layers comprises at least two separate metal sheets that overlap with each other along their respective commonly adjoining edges, providing an overlapping joint of the two separate metal foils. The at least one fibre reinforced adhesive layer comprises fibre elements embedded in a matrix structure. One of the at least one fibre reinforced adhesive layers is arranged between two adjacent metal sheet layers. The at least one cover segment is arranged on an outside surface of the laminate structure. The cover segment covers a region of the overlapping joint. The at least one cover segment comprises at least one layer of reinforcement fibres.

The term "a region" of the overlapping joint relates to the projection of two overlapping edge portions of the two metal sheets, plus an adjacent area providing a transition zone or transition region from the edge of the overlapping metal sheet to the outer surface of the other metal sheet.

The cover segment is provided as a separate sheet, separate from the metal sheets. In an example, the cover segment is made from a different material as are the metal sheets.

In one embodiment, the aircraft panel is provided as a fuselage panel. In another embodiment, the aircraft panel is provided as a wing panel, in a further embodiment, the aircraft panel is provided as an empennage panel.

In another embodiment, one (or more) single shear joint(s) of the two separate metal foils is (are) provided. In another embodiment, alternatively or in addition, one (or several) double shear joint(s) is (are) provided.

The term "outer layer" relates to a layer arranged on the outside of a stack of layers; i.e the term "outer layer" relates to the first or last layer, depending on where the layers of the respective stack are counted from.

In a further embodiment, when used for a fuselage structure of an aircraft, the term "outer layer" relates to a layer arranged on the outside of the aircraft structure.

In one embodiment, the at least one cover segment; e.g., one cover segment, two cover segments, three cover segments, four cover segments, five cover segments or more cover segments, is arranged on only one side of the aircraft panel, i.e. on one of the two outer surfaces of the laminate structure. In a further embodiment, the at least one cover segment, for example one cover segment or, as mentioned above, two or more cover segments, is arranged on both sides of the aircraft panel, i.e. on both outer surfaces of the laminate structure.

The term "a plurality of sheets" relates to at least two sheets, comprising three, four, five, six, seven, eight, nine, ten and more sheets. The commonly adjoining edges form an overlap. The overlap thus forms a load carrying sheet joint. The overlapping joint forms a splice connection of the adjacent metal foils.

An adhesive is provided between the edges of the two adjoining sheets in the overlapping region. The adhesive is provided as an adhesive connection-layer, or adhesive layer-segment. In a further example, the edges of the two adjoining sheets are connected in the overlapping region via further means, alternatively, or in addition to an adhesive, for example via bonding.

The at least one cover segment covers adjacent regions of the respective metal sheets that are connected via the overlapping joint.

The matrix structure comprises matrix material; e.g., epoxy material and/or other resin material is provided. As fibre elements that are embedded in the matrix structure, carbon fibres, glass fibres, aramid fibres, or other types of fibres for reinforcement are used.

The metal sheet layers comprise metal foil made from, for example, aluminium.

The overlapping joints may be arranged in a straight manner, i.e. when projecting the aircraft panel onto a horizontal surface, the overlapping joints form lines with linear extension. In another embodiment, the overlapping joints are arranged in a curved manner.

The overlapping provided by the overlapping joints may be arranged on one side of the metal sheets, thus extending a width, for example, in one direction. In a further embodiment, the overlapping is provided on two opposing edges of the metal sheets, for example, providing an extension of the width in two directions. In a still further embodiment, the overlapping is arranged on three or more sides of the metal sheets. The extension of the metal sheet width via the overlapping joints may be provided on further sides; e.g., on two opposing sides. In addition or alternatively, the extension is provided in the length direction, with respect to the metal sheet provided, for example, in roll segments.

For covering the resulting regions of the overlapping joints, a plurality of cover segments is provided accordingly. For example, a pattern or grid of cover segments thus may be provided.

According to an embodiment, in the region of the overlapping joint, due to the overlap of the two metal sheets, a transition region is provided, in which one of the metal sheets is arranged overlapping the other metal sheet. The transition region forms a recess, and the cover segment sealingly covers the matrix material in a groove-like recess to protect it from the environment. The recess may be a groove-like recess, for example, shaped with an approximately triangular cross-section.

According to an embodiment, in the region of the overlapping joint, due to the overlap of the two metal sheets, a transition region is provided, in which one of the metal sheets is bent such that it is arranged overlapping with the other metal sheet. The transition region forms a groove-like recess, which is at least partly filled with matrix material. The cover segment sealingly covers the matrix material in the groove-like recess from an environment.

In an example, the cover segment sealingly covers the groove-like recess such that is sealed against the environment. The cover segment thus provides a capping or closing of the matrix material to avoid the matrix material being exposed to the environment. According to a further embodiment, the groove-like recess is formed by an end face of the overlapping metal sheet arranged overlapping on the outside of the other metal sheet, and an outwards facing surface of the bent metal sheet, and a side edge zone of the overlapping joint. The cover segment is at least larger than the groove-like recess to provide a secure sealing of the groove-like recess.

According to an embodiment, in the region of the overlapping joint, the laminate is provided with a flush outer surface in the region of the overlapping joint.

The cover segment extends beyond the projection of the overlapping joint of the adjacent outer metal sheets. In an embodiment, the outer surface of the panel is flush and the metal sheets have a secondary transition zone where the cover segment ends, and wherein a secondary groove is formed. In an embodiment, the cover segment is thinner than the adjacent overlapping metal sheets and the secondary groove is smaller in its depth than the groove-like recess caused by the overlap of the metal sheets. The relative size may be larger than 1:2, e.g. 1:3 or more.

The cover segment extends beyond the projection of the overlapping joint by at least a distance of at least the thickness of the panel. In another example, the excess distance is at least the projected overlap depth, with respect to the length in a direction of the overlap.

The term "outer surface" relates to the outer contour of the panel. The term "flush" relates to a surface with a continuous or smooth contour, i.e. the contour does not reflect (or at least only in a reduced amount) an underlying overlapping joint of two adjoining panels. The underlying structure is arranged such that displacements in the extension of the panels in the different layers is equalized to an even or flush outer contour, omitting surface protrusions.

According to an embodiment, the at least one cover segment comprises a fibre/resin prepreg. According to a further embodiment, the reinforcement fibre prepregs are arranged in a unidirectional orientation crosswise to the orientation of the overlapping joint. The term "prepregs" relates to pre-impregnated fibre structures, i.e. reinforcement fibres already combined with at least some matrix material for improved handling. Instead of matrix material, binder material or the like can be provided for attaching the fibres to each other for handling purposes. The matrix material may be provided in a sufficient amount in view of the curing process. Additional matrix material may be provided after placing the prepreg on the laminate structure or on a tool.

The reinforcement fibres are arranged in a perpendicular direction with respect to an overlapping direction of the two adjoined panels. The term "perpendicular" relates to an angle of approximately 90°, for example an angle of 80° to an angle of 100°, or preferably an angle of 85° to 95°. In another embodiment, the reinforcement fibres are arranged in a bidirectional orientation having two fibre directions, wherein the two fibre directions are arranged crosswise to each other, and wherein both fibre directions are arranged transverse to the orientation of the overlapping joint.

An adhesive may be provided to attach the cover segment to the metal sheets of the outer layer. In one example, the adhesive is a resin. In another example, the adhesive is an adhesive layer provided on the cover segment. At least one cover segment is arranged on only one side of the panel on the outside of an aircraft exposed to the environment.

According to a further embodiment, besides the at least one outer layer, further layers of the metal sheet layers comprise at least two separate metal sheets that overlap each other along their respective commonly adjoining edges, providing further overlapping joints of the two separate metal sheets. In a cross-section, the further overlapping joints are arranged in a displaced manner.

The cover segment may be provided with a smaller thickness than the metal sheet layers. In another example, the cover segment is provided with a smaller thickness than the fibre reinforced adhesive layers. In a still further example, the cover segment is provided with a similar thickness than the metal sheet layers and/or than the fibre reinforced adhesive layers. For example, for the metal sheet layers, aluminium foils of 0.3 mm are provided. In another example, the cover segment is provided with a maximum thickness of half of the metal sheet layers.

According to a further embodiment, also an aircraft is provided comprising at least a fuselage structure, a wing structure, and an empennage structure. The fuselage structure, the wing structure, and/or the empennage structure is provided with a load carrying structure and covering segments that provide aerodynamically effective surfaces. At least a part of the covering segments is provided as an aircraft panel in accordance with one of the preceding examples. The aerodynamically effective surfaces are provided by the outside surface of the fuselage panel. The term "fuselage structure" relates to the main structure of an aircraft, usually housing a cockpit, a cabin, and/or a payload area. The term "wing structure" relates to structures providing the uplift when the aircraft is travelling. The term "empennage structure" relates to stabilizing surfaces for vertical and/or horizontal stabilizing.

The "aerodynamically effective surfaces" relate to surfaces exposed to airflow during flight. The "aerodynamically effective surfaces" relate to, for example, surfaces that are exposed to the outside air during flight. The "aerodynamically effective surfaces" are provided e.g. in order to generate forces acting on the aircraft's structure, i.e. on the aerodynamically effective surfaces, such as during flight for generating uplift forces or for temporarily generating steering forces (or steering thrust) to the sides, or up or down. In other words, during flight operation, the covering segments are exposed to airflow on their respective pouter surfaces (while the inner surfaces may face towards inner parts of the aircraft, i.e. parts that are not exposed to the airflow. In addition to covering segments that are exposed to the airflow during the flight, further covering segments may be provided that are exposed to the air, or even the airflow, but without being provided for generating any forces. Further, other types of covering segments may also be provided.

The load carrying structure may be provided as a frame structure, to which the covering segments are attached, for example as the aircraft skin structure. For example, the aircraft is provided as an airplane with wings. In another example, the aircraft is provided as a helicopter.

By providing at least a part of the covering segments, for example in areas with an increased span, as aircraft panels according to the above-described examples with the particular laminate structure comprising the cover segments, increased stability of the outer structure is provided, thus providing an increased performance over the lifetime of the structure.

In accordance with a further embodiment, a method for manufacturing an aircraft panel is provided, comprising the following steps:

a) arranging at least one cover segment that comprises at least one layer of reinforcement fibres on a tool;
b) arranging on the tool at least two separate metal sheets that overlap with each other along their respective commonly adjoining edges, providing an overlapping joint of the two separate metal sheets, wherein the overlapping joint is arranged on the cover segment, and wherein the metal sheets form a metal sheet layer;
c) arranging on the metal sheet layer a fibre reinforced adhesive layer, comprising fibre elements embedded in a matrix structure; and
d) arranging a further metal sheet layer on the fibre reinforced adhesive layer.

In an example, the provided laminate structure is cured by applying heat and/or pressure. In a further example, the curing process is provided by curing of the matrix structure without heat and the application of pressure.

According to a further embodiment, before step a), a first tool with a flush surface contour is provided for the placing of the laminate structure. For example, after step d), a second tool is provided for applying pressure and/or heat. Steps c) and d) are repeated, thus forming a stack of a plurality of metal sheet layers arranged in an alternating manner such that one fibre reinforced adhesive layer is arranged between two adjacent metal sheet layers. According to an embodiment, a plurality of metal sheet layers comprises at least two separate metal sheets with an overlapping joint.

According to a further embodiment, also the use of an aircraft panel according to one of the above-mentioned examples in an aircraft is provided.

According to a further embodiment, a cover segment is provided bridging a zone in which a resin rich part of the panel is arranged on the outside of the panel, in particular in view of the use on a fuselage structure, where such zone would be exposed to the outside of the fuselage. The bridging is provided by components having the capacity of not only covering this region, but also of providing the transmission of tensile forces, for example prepregs, or other mat-like structures, also referred to as fibre mats. Thus, an overlapping region of a metal foil/metal foil joint is covered and thus sealed against environmental influences. Hence, by covering the zones where otherwise resin would be exposed on the outside, wherein the covering is arranged by cured prepreg fibre layer(s), the life performance of the overall construction is increased significantly.

These and other objects, features and advantages of the present embodiment will become apparent from the following detailed description taken in conjunction with the accompanying drawings.

BRIEF DESCRIPTION OF THE DRAWINGS

The various embodiments will hereinafter be described in conjunction with the Wowing drawing figures; wherein like numerals denote like elements.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
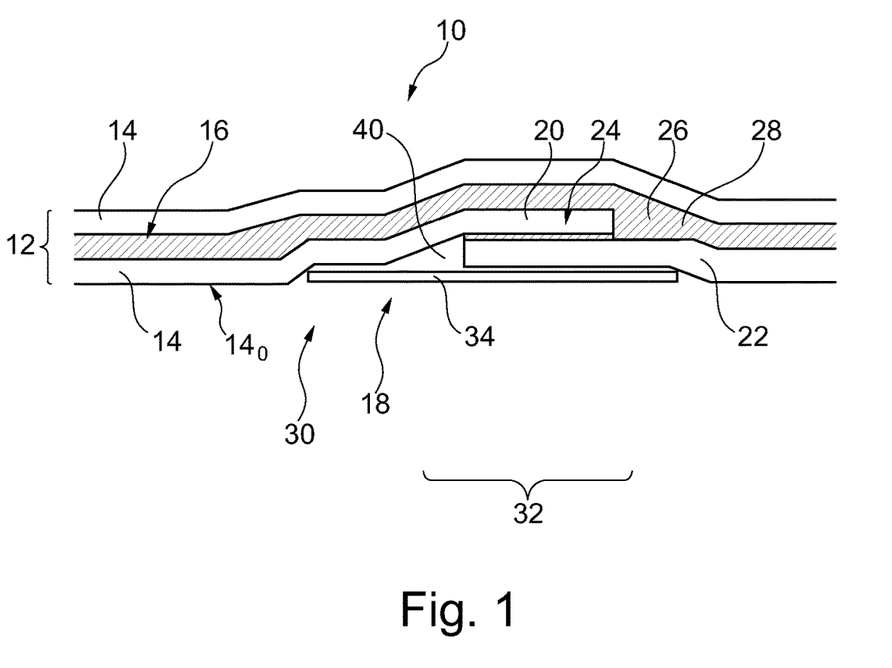
FIG. 1's a cross-sectional view of an exemplary aircraft panel with a laminate structure.

FIG. 1's a cross-sectional view of an aircraft panel 10 having a laminate structure 12 comprising a stack of a plurality of metal sheet layers 14 and at least one fibre reinforced adhesive layer 16. Still further, at least one cover segment 18 is provided. One outer layer, indicated with reference numeral $14_O$, of the metal sheet layers 14 comprises at least two separate metal sheets; indicated with reference numeral 20 and reference numeral 22. The outer layer $14_O$ is designated by a reference arrow indicating the arrangement of the layer such that one of its surfaces is arranged on the outside of the panel, i.e. in FIG. 1 arranged on the lower side. Both of the two metal sheets 20 and 22 form the outer layer $14_O$. and are provided on the outside of the panel 10 except or the part where the cover segment 18 is arranged (and the cover segment thus forms an outside surface in this region). The two separate metal sheets overlap with each other along their respectively commonly adjoining edges, providing an overlapping joint 24 of the two separate metal sheets 20 and 22. The at least one fibre reinforced adhesive layer 16 comprises fibre elements 26 (not shown in detail) embedded in a matrix structure 28. One of the at least one fibre reinforced adhesive layers is arranged between two adjacent metal sheet layers. In the example shown in FIG. 1, only one fibre reinforced adhesive layer is shown as a minimum with two metal sheet layers 14. However, more than the shown number of the respective layers may be provided in further examples, as will be shown with reference to FIG. 2. The at least one cover segment 18 is arranged on an outside surface 30 of the laminate structure 12, the cover segment covering a region 32 of the overlapping joint 24. The at least one cover segment comprises at least one layer of reinforcement fibres 34. The reinforcement fibres are not further indicated in the drawing.

Figure 2:
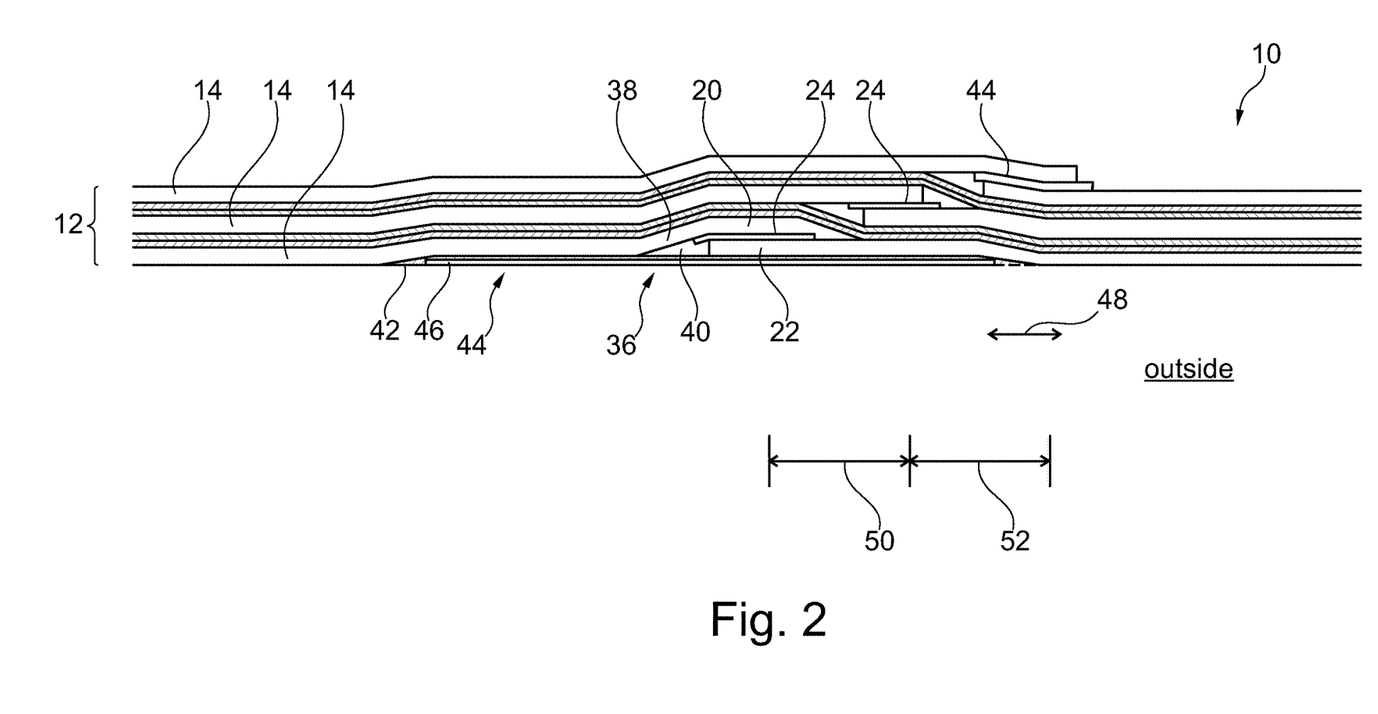
FIG. 2 shows a cross-sectional view through an exemplary aircraft panel with a laminate structure.

In FIG. 2, a further example is shown with the laminate structure 12 comprising, as illustrated for description purposes, three layers of the metal sheet layer 14. Further, the three layers of the metal sheet layers 14 are each provided with two separate metal sheets, thus forming three of the overlapping joints 24.

For example, in the region of the overlapping joint 24, due to the overlap of the two metal sheets 20 and 22, a transition region 36 is provided, in which one of the metal sheets, for example the metal sheet 20, is bent, indicated with reference numeral 38, such that it is arranged overlapping with the other metal sheet, i.e. the metal sheet 22, in the overlapping joint 24. The transition region forms a groove-like recess 40, which is at least partly filled with matrix material. The cover segment 18 sealingly covers the matrix material in the groove-like recess 40 from an environment, e.g. an environment provided in the area, with reference to the drawing, below the structure.

As indicated with a contour line 42, in the region of the overlapping joint, or overlapping connection, the laminate structure 12 is provided with a flush outer surface 44.

It must be noted that the respective illustrations of FIGS. 1 and 2 are shown for schematic explanation and thus do not show any possible curved arrangement of the panel, for example when used for aircraft fuselage constructions, usually having one or bidirectionally curved surfaces.

The at least one cover segment 18 comprises a fibre/resin prepreg 46, according to one example. The reinforcement fibres of the prepregs 46 are arranged in a unidirectional orientation, for example as indicated with double arrow 48, having a crosswise orientation to the orientation of the overlapping joint (the orientation of the overlapping joint not further indicated in FIG. 2).

As mentioned above, besides the at least one outer layer, also the further layers, for example all further layers, or only a part of the further layers of the metal sheet layers 14 comprise at least two separate metal sheets that overlap with each other along their respectively commonly adjoining edges, thus providing further overlapping joints of the two separate metal sheets. As indicated, the further overlapping joints are arranged in a displaced manner, indicated with displacement steps 50 and 52. The bending is schematically shown with polygonal formations. Of course, bending will take place in a more curved and adapted manner.

Figure 3:
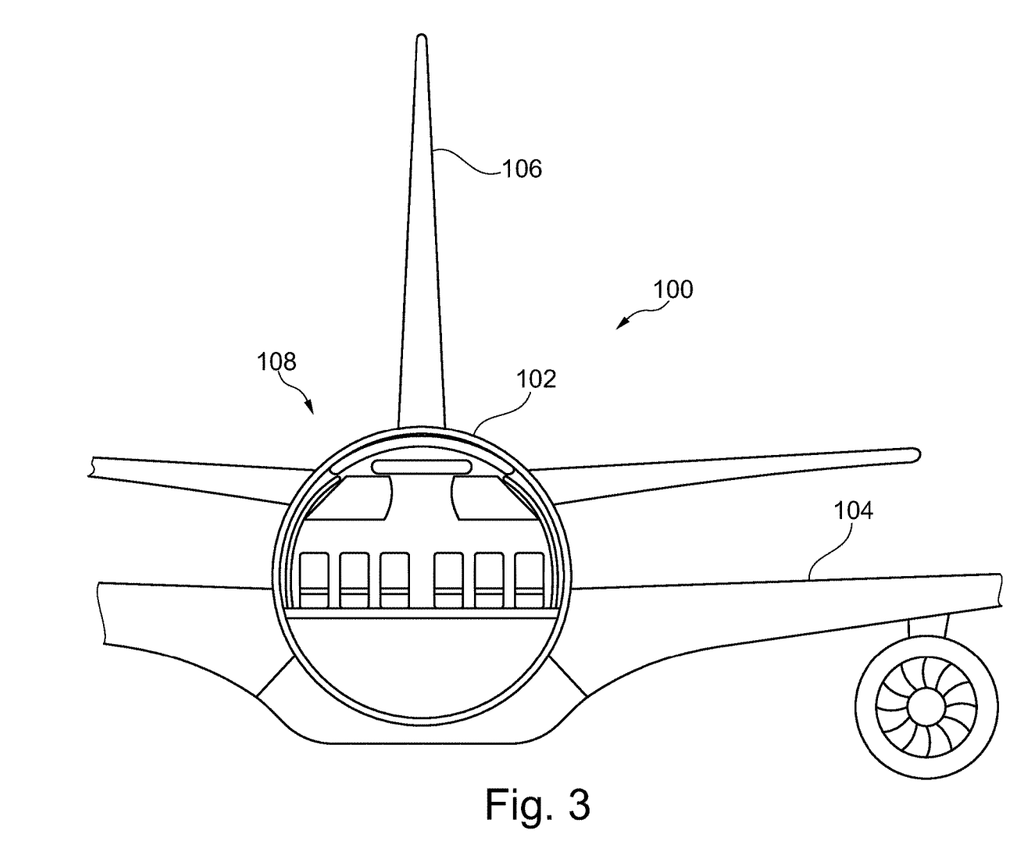
FIG. 3 shows a schematic cross-sectional illustration of an aircraft.

FIG. 3 shows an aircraft 100 comprising at least a fuselage structure 102, a wing structure 104, and an empennage structure 106, of which the tail structure is indicated. The fuselage structure 102, the wing structure 104, and/or the empennage structure 106 is provided with a load carrying structure (not further shown) and covering segments, for example fuselage outer skin structure 108, providing aerodynamically effective surfaces. At least a part of the covering segments is provided as aircraft panels according to one of the above-mentioned examples. The aerodynamically effective surfaces are provided by the outside surface of the fuselage panel.

Figure 4:
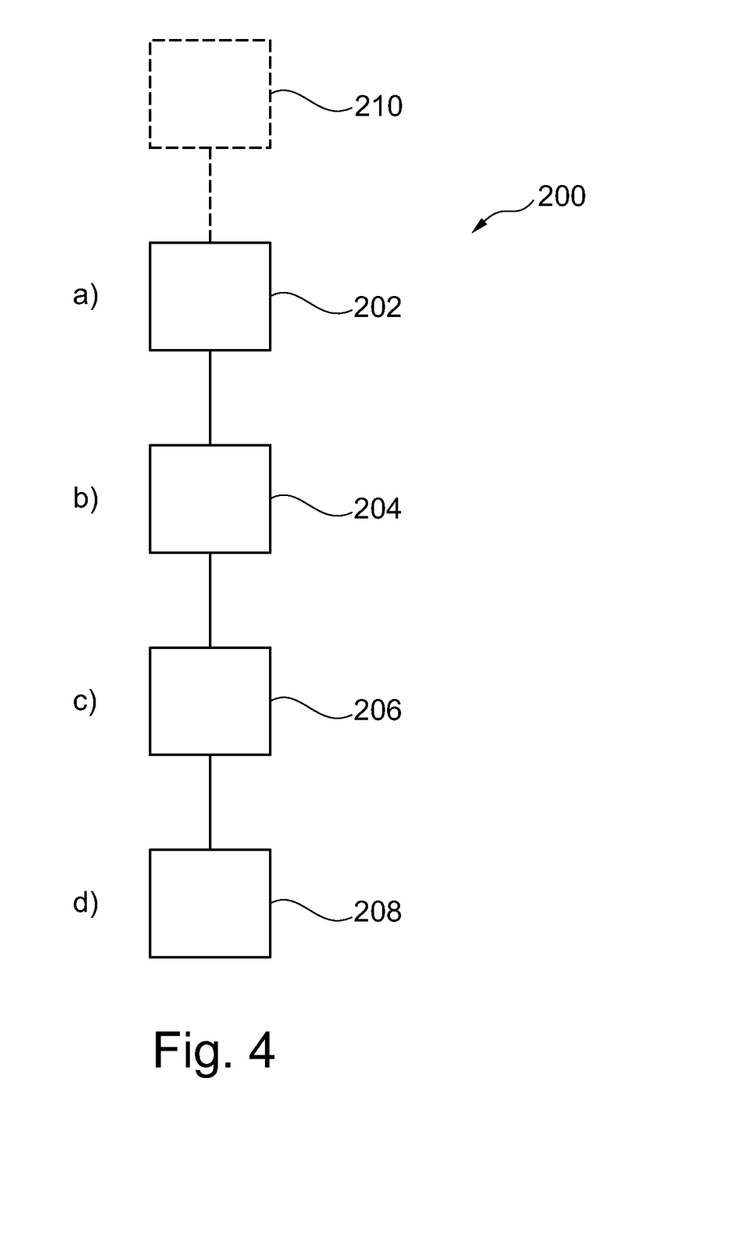
FIG. 4 illustrates the steps of an exemplary example of a method for manufacturing an aircraft panel with a laminate structure.

FIG. 4 shows a method 200 for manufacturing an aircraft panel. The following steps are provided. In a first arrangement step 202, at least one cover segment that comprises at least one layer of reinforcement fibres is arranged on a tool. In a second arrangement step 204, two separate metal sheets are arranged on the tool, wherein the two metal sheets overlap with each other along their respectively commonly adjoining edges, providing an overlapping joint of the two separate metal sheets. The overlapping joint is arranged on the cover segment. The metal sheets form a metal sheet layer. In a third arrangement step 206, a fibre reinforced adhesive layer is arranged on the metal sheet layer, wherein the fibre reinforced adhesive layer comprises fibre elements embedded in a matrix structure. In a fourth arrangement step 208, a further metal sheet layer is arranged on the fibre reinforced adhesive layer.

The first arrangement step 202 is also referred to as step a), the second arrangement step 204 as step b), the third arrangement step 206 as step c), and the fourth arrangement step 208 as step d).

In a further example, indicated as an option (step 210) with dotted lines in FIG. 4, before step a), a first tool with a flush surface contour is provided for placing of the laminate structure.

Figure 5:
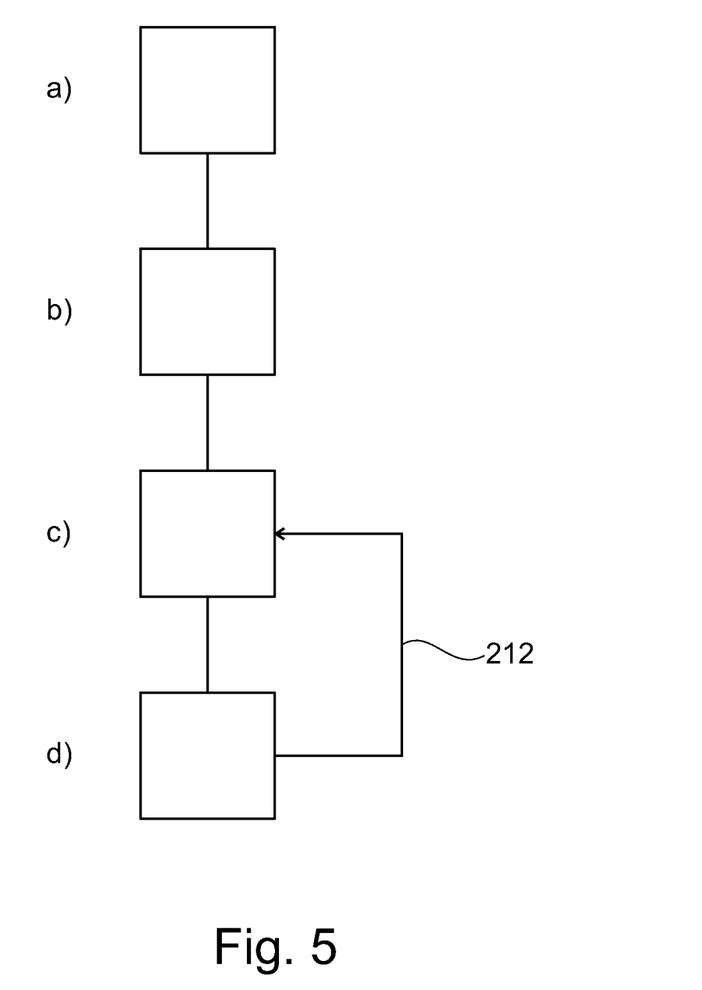
FIG. 5 illustrates a further exemplary method for manufacturing an aircraft panel with a laminate structure.

FIG. 5 shows an example, according to which steps c) and d) are repeated, as indicated with repetition arrow 212, thus forming a stack of a plurality of metal sheet layers arranged in an alternating manner such that one fibre reinforced adhesive layer is arranged between two adjacent metal sheet layers.

In a further example, not further shown, a plurality of metal sheet layers comprises at least two separate metal sheets with an overlapping joint.

It has to be noted that embodiments of the embodiment are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the embodiments have been illustrated and described in detail in the drawings and foregoing description, such illustration and description are to be considered illustrative or exemplary and not restrictive. The embodiments are not limited to the disclosed embodiments. Other variations to the disclosed embodiments can be understood and effected by those skilled in the art in practicing a claimed embodiment, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An aircraft panel with a laminate structure, the laminate structure comprising:
    a stack of a plurality of metal sheet layers;
    at least one fibre reinforced adhesive layer; and
    at least one cover segment;
        wherein at least one outer layer of the metal sheet layers comprises at least two separate metal sheets that overlap with each other along their respective commonly adjoining edges, providing an overlapping joint of the two separate metal sheets;
        wherein the at least one fibre reinforced adhesive layer comprises fibre elements embedded in a matrix structure;
        wherein one of the at least one fibre reinforced adhesive layers is arranged between two adjacent metal sheet layers;
        wherein the at least one cover segment is arranged on an outside surface of the laminate structure, the cover segment covering a region of the overlapping joint; and
        wherein the at least one cover segment comprises at least one layer of reinforcement fibres.

2. The panel of claim 1, wherein in the region of the overlapping joint, due to the overlap of the two metal sheets, a transition region is provided, in which one of the metal sheets is arranged overlapping with the other metal sheet;
    wherein the transition region forms a recess; and
    wherein the cover segment sealingly covers the matrix material in the groove-like recess from an environment.

3. The panel of claim 1, wherein in the region of the overlapping joint, due to the overlap of the two metal sheets, a transition region is provided, in which one of the metal sheets is bent such that it is arranged overlapping with the other metal sheet;
    wherein the transition region forms a groove-like recess, which is at least partly filled with matrix material; and
    wherein the cover segment sealingly covers the matrix material in the groove-like recess from an environment.

4. The panel of claim 3, wherein the groove-like recess is formed by:
    an end face of the overlapping metal sheet arranged overlapping on the outside of the other metal sheet; and
    an outwards facing surface of the metal sheet;
    a side edge zone of the overlapping joint;
        wherein the cover segment is at least larger than the groove-like recess to provide a secure sealing of the groove-like recess.

5. The panel of claim 1, wherein, in the region of the overlapping joint, the laminate is provided with a flush outer surface.

6. The panel of to claim 1, wherein the at least one cover segment comprises a fibre/resin prepreg.

7. The panel of claim 4, wherein the reinforcement fibres of the prepreg are arranged in a unidirectional orientation crosswise to an orientation of the overlapping joint.

8. The panel of claim 1, wherein, besides the at least one outer layer, also further layers of the metal sheet layers comprise at least two separate metal sheets that overlap with each other along their respective commonly adjoining edges, providing further overlapping joints of the two separate metal sheets; and
    wherein in a cross-section direction, the further overlapping joints are arranged in a displaced manner.

9. An aircraft, comprising:
    a fuselage structure;
    a wing structure; and
    an empennage structure;
        wherein the fuselage structure, the wing structure, and/or the empennage structure is provided with a load carrying structure and covering segments providing aerodynamically effective surfaces;
        wherein at least a part of the covering segments is provided as an aircraft panel according to claim 1; and
        wherein the aerodynamically effective surfaces are provided by the outside surface of the fuselage panel.

10. A method for manufacturing an aircraft panel, comprising:
    a) arranging at least one cover segment that comprises at least one layer of reinforcement fibres on a tool;
    b) arranging on the tool at least two separate metal sheets that overlap with each other along their respective commonly adjoining edges, providing an overlapping joint of the two separate metal sheets, wherein the overlapping joint is arranged on the cover segment, and wherein the metal sheets form a metal sheet layer;
    c) arranging on the metal sheet layer a fibre reinforced adhesive layer, comprising fibre elements embedded in a matrix structure; and
    d) arranging a further metal sheet layer on the fibre reinforced adhesive layer.

11. The method of claim 10, wherein before step a) a first tool with a flush surface contour is provided for the placing of the laminate structure.

12. The method of claim 10, wherein steps c) and d) are repeated forming a stack of a plurality of metal sheet layers arranged in an alternating manner such that one fibre reinforced adhesive layer is arranged between two adjacent metal sheet layers.

13. The method of claim 10, wherein a plurality of metal sheet layers comprises at least two separate metal sheets with an overlapping joint.

* * * * *